United States Patent
Kajino et al.

(10) Patent No.: US 12,469,121 B2
(45) Date of Patent: Nov. 11, 2025

(54) ABNORMALITY INSPECTION SYSTEM AND METHOD FOR DETECTING ABNORMALITY OF CURVED COMPONENT USING TWO DIFFERENT LEARNING MODELS

(71) Applicant: TOYOTA JIDOSHA KABUSHIKI KAISHA, Toyota (JP)

(72) Inventors: Akihiro Kajino, Miyoshi (JP); Haruka Tai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 693 days.

(21) Appl. No.: 17/850,151

(22) Filed: Jun. 27, 2022

(65) Prior Publication Data

US 2023/0028335 A1   Jan. 26, 2023

(30) Foreign Application Priority Data

Jul. 21, 2021   (JP) ................................ 2021-120603

(51) Int. Cl.
*G06T 7/00* (2017.01)
*G05B 19/418* (2006.01)
*G01M 13/025* (2019.01)

(52) U.S. Cl.
CPC ...... *G06T 7/0008* (2013.01); *G05B 19/41875* (2013.01); *G05B 19/4188* (2013.01); *G06T 7/0004* (2013.01); *G01M 13/025* (2013.01); *G06T 2207/10016* (2013.01)

(58) Field of Classification Search
CPC ......... G06T 7/0004; G06T 2207/10016; G06T 2207/30164; G06T 7/0008; G05B 19/41875; G05B 19/4188; G01M 13/025
See application file for complete search history.

(56) References Cited

U.S. PATENT DOCUMENTS

| | | | |
|---|---|---|---|
| 2014/0015961 A1* | 1/2014 | Aono | H04N 7/18 348/128 |
| 2017/0277979 A1* | 9/2017 | Allen | G06F 18/2411 |
| 2018/0211374 A1* | 7/2018 | Tanaka | G06V 10/945 |
| 2020/0064277 A1* | 2/2020 | Hucker | G01N 21/9515 |
| 2020/0096454 A1* | 3/2020 | Konishi | G01N 21/88 |
| 2020/0293831 A1 | 9/2020 | Matsuda et al. | |
| 2021/0027440 A1* | 1/2021 | Sakuyama | G01N 21/9515 |
| 2021/0160194 A1* | 5/2021 | Prasad | H04L 41/0873 |

(Continued)

FOREIGN PATENT DOCUMENTS

| | | |
|---|---|---|
| JP | 2009-109440 A | 5/2009 |
| JP | 2020-149578 A | 9/2020 |

(Continued)

*Primary Examiner* — Michael P LaPage
(74) *Attorney, Agent, or Firm* — Sughrue Mion, PLLC

(57) ABSTRACT

An abnormality inspection system S1 according to an embodiment includes: an image acquisition unit configured to acquire a plurality of pieces of continuous pickup data of a component such that an identical spot of the component is contained in mutually different regions of the plurality of pieces of continuous pickup data; and a configured to detect presence or absence of abnormality in the plurality of pieces of continuous pickup data, and to determine that the component is abnormal, in a case where the abnormality is detected in all of the plurality of pieces of pickup data.

9 Claims, 15 Drawing Sheets

IMAGES ON WHICH SHRINKAGE CAVITY IS ON CAM PORTION SURFACE

(56) References Cited

U.S. PATENT DOCUMENTS

| | | | |
|---|---|---|---|
| 2022/0335586 A1* | 10/2022 | Yahashi | G06T 11/00 |
| 2022/0366558 A1* | 11/2022 | Bufi | G01N 35/0099 |
| 2024/0087303 A1* | 3/2024 | Bufi | G06V 10/82 |
| 2024/0160194 A1* | 5/2024 | Bakhshmand | G06N 20/10 |
| 2024/0385121 A1* | 11/2024 | Bakhshmand | G06V 10/26 |

FOREIGN PATENT DOCUMENTS

| | | | |
|---|---|---|---|
| WO | 2021/062536 A1 | 4/2021 | |
| WO | WO-2021064893 A1 * | 4/2021 | G06T 11/00 |

* cited by examiner

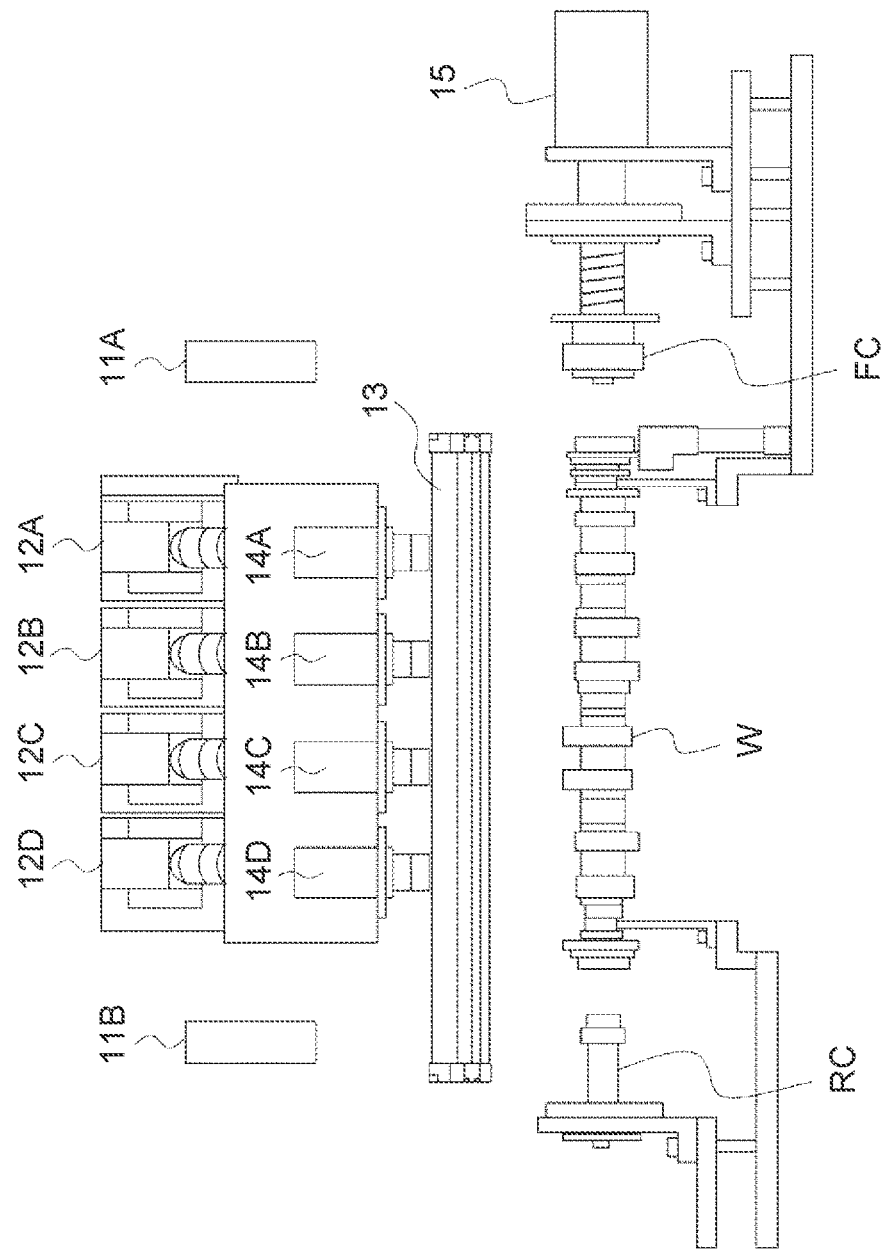

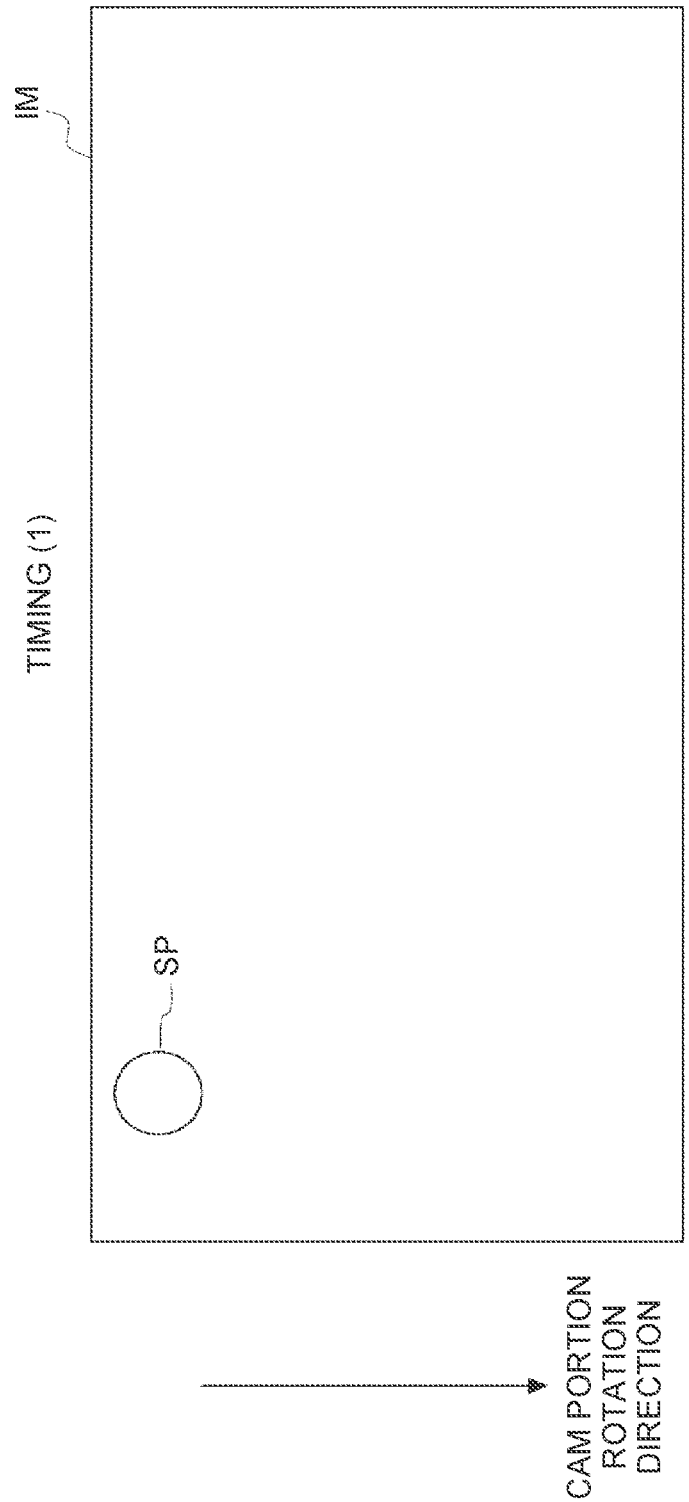

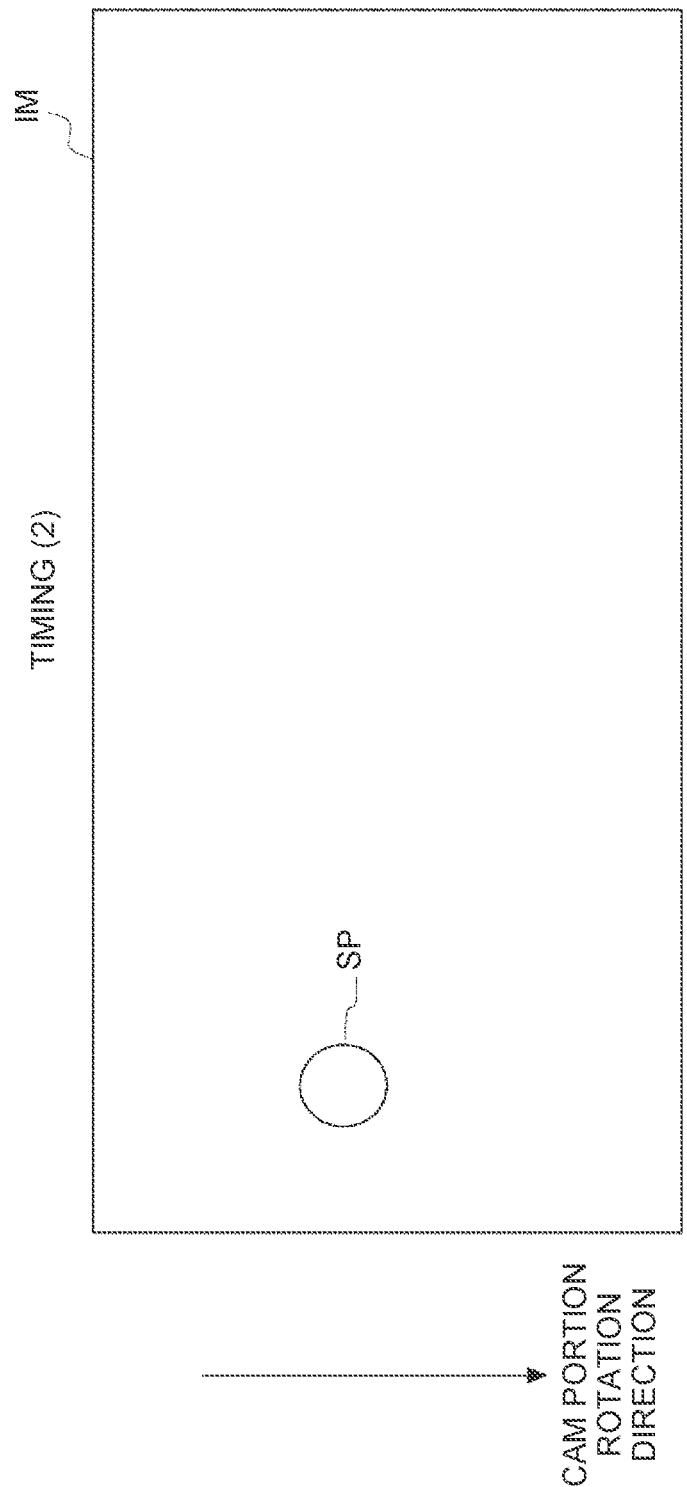

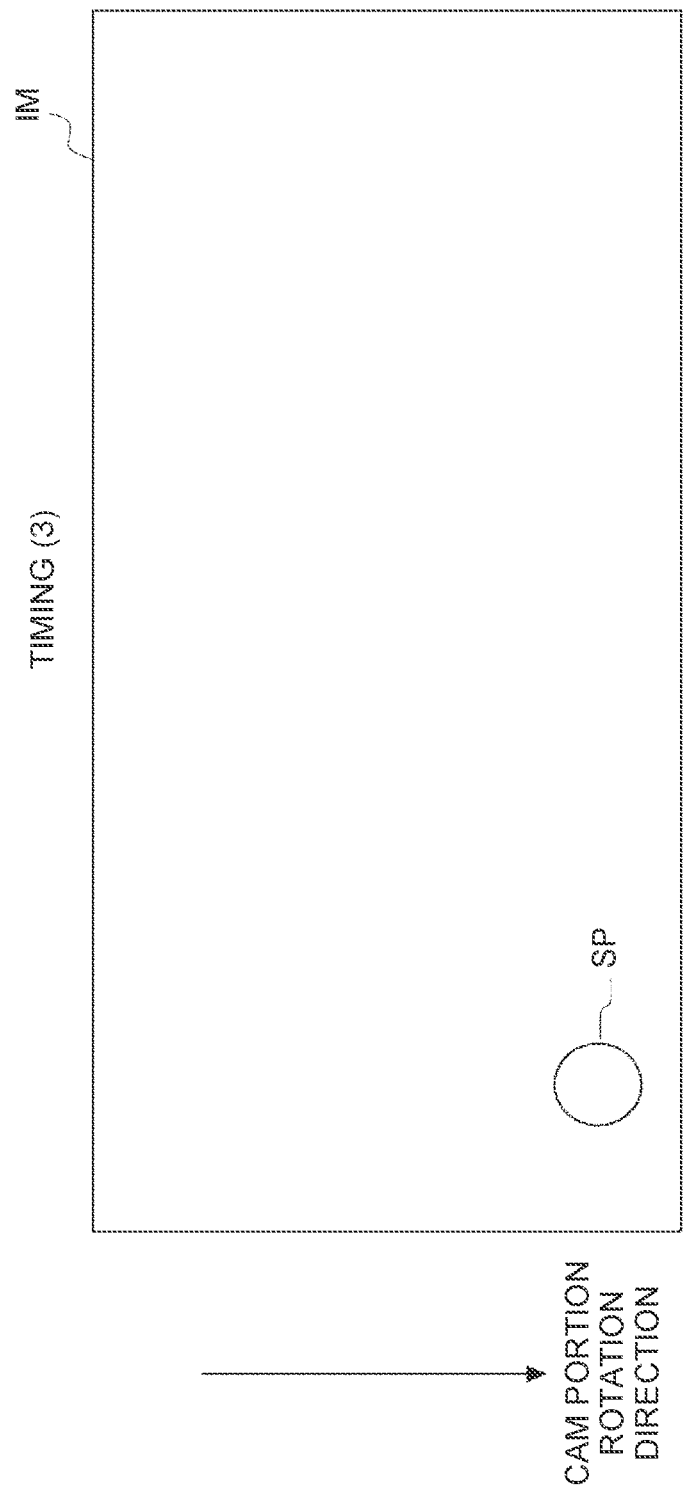

IMAGES ON WHICH SHRINKAGE CAVITY
IS ON CAM PORTION SURFACE

IMAGES ON WHICH LIQUID DROPLET
IS ON CAM PORTION SURFACE

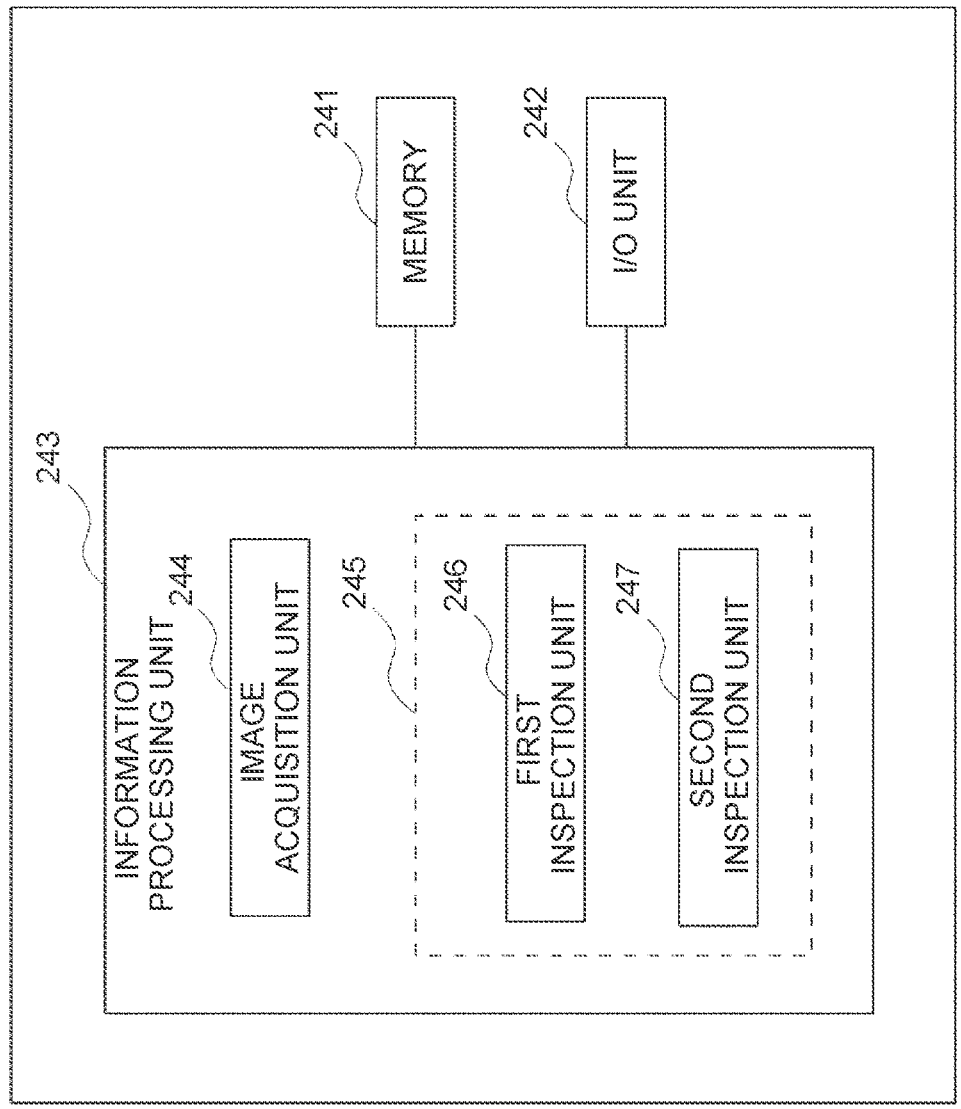

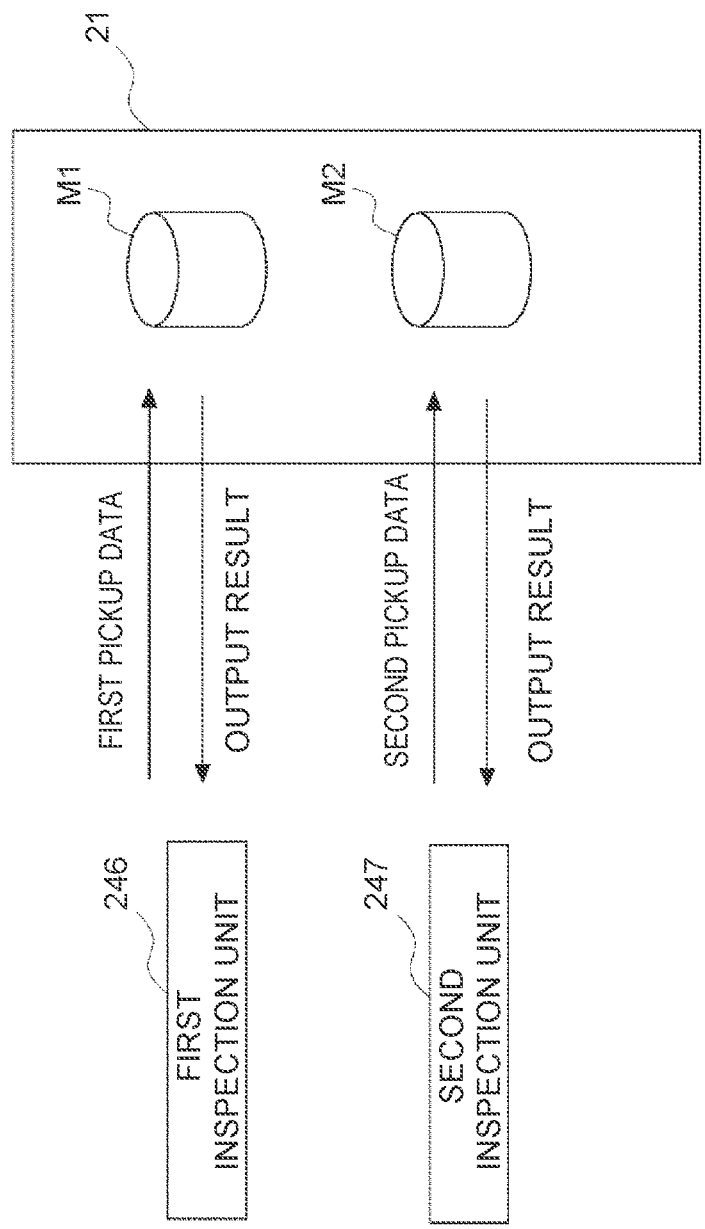

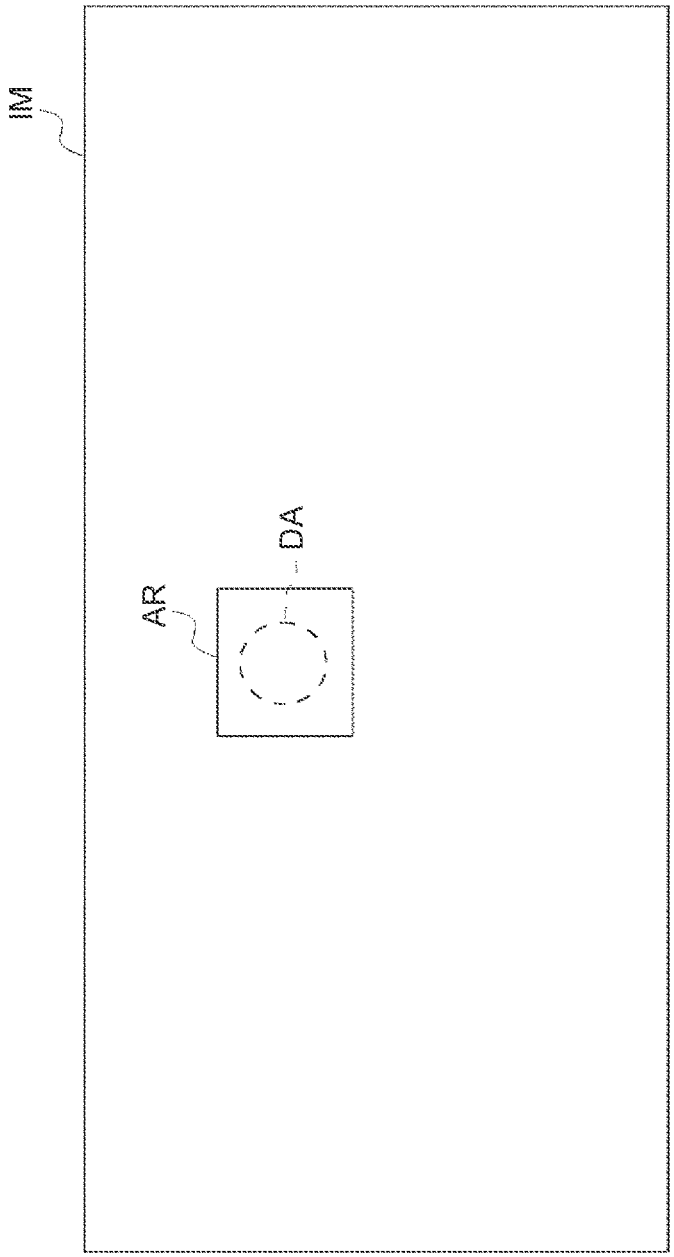

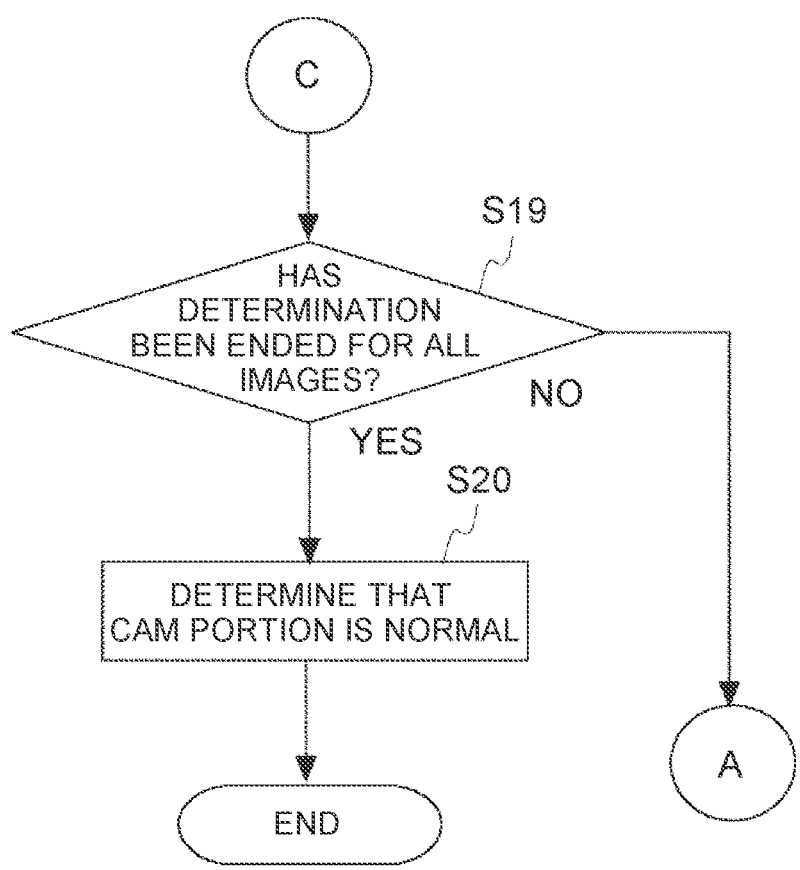

ABNORMALITY INSPECTION SYSTEM AND METHOD FOR DETECTING ABNORMALITY OF CURVED COMPONENT USING TWO DIFFERENT LEARNING MODELS

CROSS-REFERENCE TO RELATED APPLICATION

This application claims priority to Japanese Patent Application No. 2021-120603 filed on Jul. 21, 2021, incorporated herein by reference in its entirety.

BACKGROUND

1. Technical Field

The present disclosure relates to an abnormality inspection system, an abnormality inspection method and a program.

2. Description of Related Art

Industrial components need to be checked in a production process, to prevent the shipment of low-quality components. For example, Japanese Unexamined Patent Application Publication No. 2020-149578 describes a technology of determining a specification class of a component using an after-learning model that has learned by machine learning.

SUMMARY

As an example, an inspection device that inspects the component can determine the abnormality of a component surface by photographing the component and analyzing the pickup data. However, the inspection device can wrongly detect that a spot on the component surface that is not the abnormality of the component substantially, for example, a spot including a liquid droplet or a brush scar, is abnormal.

The present disclosure provides an abnormality inspection system, an abnormality inspection method and a program that make it possible to exactly detect the abnormality of the component.

An abnormality inspection system according to an exemplary aspect of the present disclosure includes: an acquisition unit configured to acquire a plurality of pieces of continuous pickup data of a component such that an identical spot of the component is contained in mutually different regions of the plurality of pieces of continuous pickup data; and a configured to detect presence or absence of abnormality in the plurality of pieces of continuous pickup data, and to determine that the component is abnormal, in a case where the abnormality is detected in all of the plurality of pieces of pickup data. The abnormality inspection system determines the abnormality of the component based on a detection result relevant to the plurality of pieces of pickup data in which the identical spot of the component is photographed in different states, and therefore can exactly detect the abnormality of the component compared to the determination based on a detection result relevant to a single piece of pickup data.

In the above abnormality inspection system, the may detect the presence or absence of the abnormality, by inputting the plurality of pieces of continuous pickup data, to a first learning model that has learned using pickup data of the component as teaching data. The abnormality inspection system detects the abnormality with the learning model after learning, and therefore can more accurately determine the presence or absence of the abnormality.

In the above abnormality inspection system, the may input a single piece of the pickup data acquired by the acquisition unit, to the first learning model, and when the determines that the abnormality is detected in the single piece of the pickup data, from an output result of the first learning model, the may detect the presence or absence of the abnormality in all of the plurality of pieces of pickup data, by inputting other pieces of the pickup data picked up so as to be continuous with the single piece of the pickup data, to the first learning model. The abnormality inspection system first executes the determination with the first learning model using a single piece of the pickup data, and in the case where there is no abnormality as a result, the abnormality inspection system does not execute a further process for the pickup data. Therefore, it is possible to restrain unnecessary processes, and to more efficiently perform the inspection.

In the above abnormality inspection system, the first learning model may be a model in which an output result is a type of abnormality about an external appearance of the component, and the may determine the presence or absence of the abnormality of the component, depending on the type of the abnormality about the external appearance of the component, the type of the abnormality about the external appearance of the component being indicated as the output result of the first learning model for the plurality of pieces of continuous pickup data. It is possible to restrain the abnormality inspection system from wrongly detecting that a component that is abnormal about the external appearance but is not abnormal in terms of the substantial quality of the component is abnormal. That is, the abnormality inspection system can restrain the excessive detection.

In the above abnormality inspection system, the may determine the presence or absence of doubt of the abnormality, by inputting the pickup data acquired by the acquisition unit, to a second learning model that has learned using pickup data of the component as teaching data and that is different from the first learning model, and may determine the presence or absence of the abnormality, by inputting the plurality of pieces of continuous pickup data including pickup data for which it is determined that there is doubt of the abnormality, to the first learning model. The abnormality inspection system determines the abnormality of the component, using two kinds of different learning models, and therefore can enhance the accuracy of the inspection of the abnormality.

In the above abnormality inspection system, the may input a single piece of the pickup data acquired by the acquisition unit, to the second learning model, and when the determines that the abnormality about an external appearance is detected in the single piece of the pickup data, from an output result of the second learning model, the may input other pieces of the pickup data picked up so as to be continuous with the single piece of the pickup data, to the second learning model, and may determine that there is doubt of the abnormality, in a case where the abnormality about the external appearance is detected in the other pieces of the pickup image. The abnormality inspection system first executes the determination with the second learning model using a single piece of the pickup data, and in the case where there is no abnormality as a result, the abnormality inspection system does not execute a further process for the pickup data. Therefore, it is possible to restrain unnecessary processes, and to more efficiently perform the inspection.

In the above abnormality inspection system, the acquisition unit may acquire the pickup data of the component such that the identical spot of the component is contained in at least three pieces of continuous pickup data. The abnormality inspection system determines the abnormality of the component based on a detection result using three or more pieces of the pickup data in which the identical spot of the component is distributed at different places in images. Accordingly, it is possible to restrain the noise due to an image characteristic such as the degree of irradiation with light, in the inspection, and therefore it is possible to more exactly detect the abnormality of a cam portion.

In the above abnormality inspection system, the acquisition unit may acquire pickup data of a curved surface portion of the component photographed in a state where the component is rotated by a rotation mechanism that supports the component and rotates the component about an axis. Thereby, the abnormality inspection system can efficiently acquire the continuous pickup data of the component, and therefore can shorten the time spent on the whole inspection.

An abnormality inspection method according to an exemplary aspect of the present disclosure is an abnormality inspection method in which an abnormality inspection system executes: an acquisition step of acquiring a plurality of pieces of continuous pickup data of a component such that an identical spot of the component is contained in mutually different regions of the plurality of pieces of continuous pickup data; and a determination step of detecting presence or absence of abnormality in the plurality of pieces of continuous pickup data, and determining that the component is abnormal, in a case where the abnormality is detected in all of the plurality of pieces of pickup data. Thereby, the abnormality inspection system determines the abnormality of the component based on a detection result relevant to the plurality of pieces of pickup data in which the identical spot of the component is photographed in different states, and therefore can exactly detect the abnormality of the component compared to the determination based on a detection result relevant to a single piece of pickup data.

A program according to an exemplary aspect of the present disclosure causes a computer to execute: an acquisition step of acquiring a plurality of pieces of continuous pickup data of a component such that an identical spot of the component is contained in mutually different regions of the plurality of pieces of continuous pickup data; and a determination step of detecting presence or absence of abnormality in the plurality of pieces of continuous pickup data, and determining that the component is abnormal, in a case where the abnormality is detected in all of the plurality of pieces of pickup data. Thereby, the computer determines the abnormality of the component based on a detection result relevant to the plurality of pieces of pickup data in which the identical spot of the component is photographed in different states, and therefore can exactly detect the abnormality of the component.

The present disclosure can provide the abnormality inspection system, abnormality inspection method and program that make it possible to exactly detect the abnormality of the component.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a detail diagram showing an example of an inspection device in the abnormality inspection system according to Embodiment 1;

FIG. 2D is a diagram showing an image of the cam portion that is photographed at a timing (1) in Embodiment 1;

FIG. 2E is a diagram showing an image of the cam portion that is photographed at a timing (2) in Embodiment 1;

FIG. 2F is a diagram showing an image of the cam portion that is photographed at a timing (3) in Embodiment 1;

FIG. 3A is a block diagram showing an example of a control unit according to Embodiment 1;

FIG. 3B is a schematic diagram showing a relation of inspection units and learning models according to Embodiment 1;

FIG. 3C is a schematic diagram showing an example of image cutout according to Embodiment 1;

FIG. 4C is a flowchart showing the processing example when the abnormality inspection system according to Embodiment 1 executes the inspection of the cam portion.

DETAILED DESCRIPTION OF EMBODIMENTS

Embodiment 1

Figure 1:
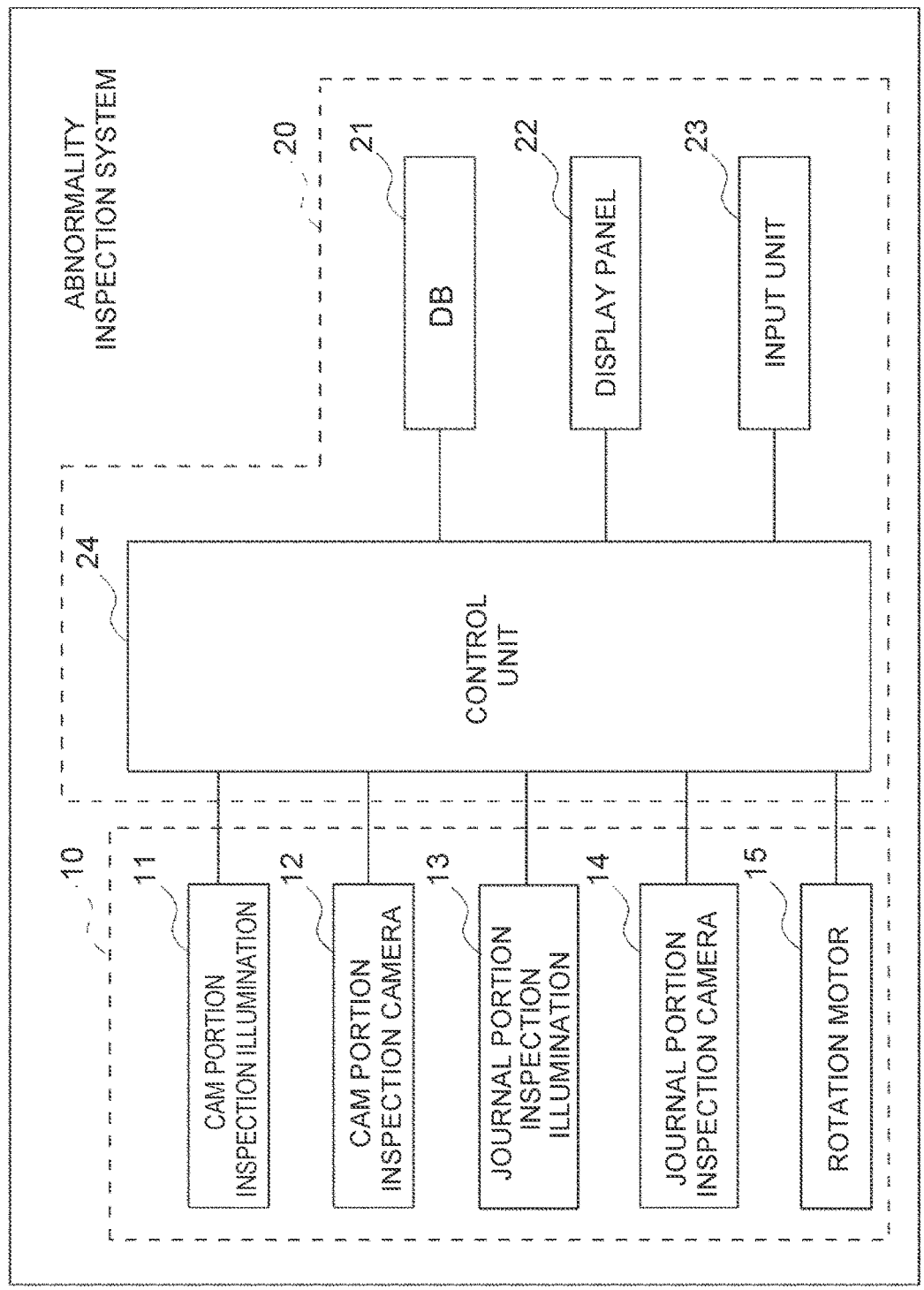
FIG. 1 is a block diagram showing an example of an abnormality inspection system according to Embodiment 1.

An Embodiment of the present disclosure will be described below with reference to the drawings.
Abnormality Inspection System FIG. 1 is a diagram for describing an abnormality inspection system according to an embodiment. As shown in FIG. 1, an abnormality inspection system S1 according to the embodiment incudes an inspection device 10 and an information processing device 20. The abnormality inspection system S1 according to the embodiment causes a camera of the inspection device 10 to pick up a surface of an inspection object component, while a user operates the information processing device 20, and causes the information processing device 20 to inspect whether there is abnormality on the surface. In this example, the inspection object component is a camshaft. Details of the inspection device 10 and the information processing device 20 will be described below.

The inspection device 10 includes a cam portion inspection illumination 11, a cam portion inspection camera 12, a journal portion inspection illumination 13, a journal portion inspection camera 14 and a rotation motor 15.

FIG. 2A is a detail diagram showing an example of the inspection device 10, and each constituent element of the inspection device 10 will be described with use of this figure. As the cam portion inspection illumination 11, a cam portion inspection illumination 11A is provided on a front side of an inspection object component W, and a cam portion inspection illumination 11B is provided on a rear side of the inspection object component W. When a cam portion of the inspection object component W is inspected, the information processing device 20 puts on the respective illuminations. As the cam portion inspection camera 12, cam portion inspection cameras 12A to 12D are provided between the front side and rear side of the inspection object component W. By the control from the information processing device 20, each cam portion inspection camera 12 continuously photographs a region of the cam portion that the cam portion inspection illumination 11 irradiates with light, multiple times, and thereby photographs pickup data (image) of the cam portion.

The journal portion inspection illumination 13 is put on by the control from the information processing device 20, when a journal portion of the inspection object component W is inspected. As the journal portion inspection camera 14, journal portion inspection cameras 14A to 14D are provided between the front side and rear side of the inspection object component W. By the control from the information processing device 20, each journal portion inspection camera 14 continuously photographs a region of the journal portion that the journal portion inspection illumination 13 irradiates with light, multiple times, and thereby photographs pickup data of the journal portion. Each of the cam portion inspection camera 12 and the journal portion inspection camera 14 is a so-called area camera in which pickup elements of the camera are provided in a planar shape (that is, a plurality of pickup elements is provided lengthwise and breadthwise).

Figure 2B:
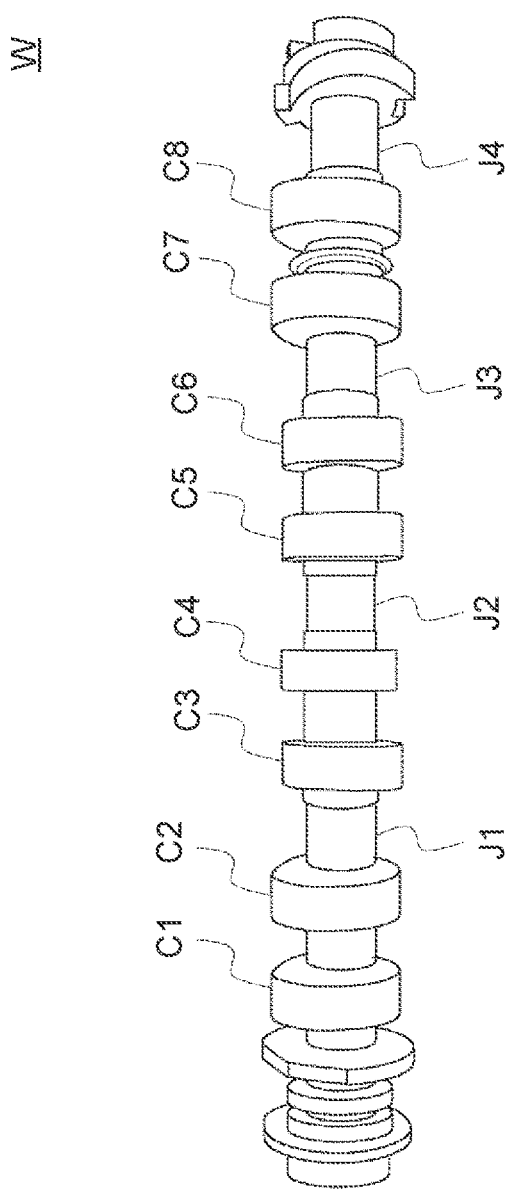
FIG. 2B is a diagram showing an example of an inspection object component according to Embodiment 1.

FIG. 2B is an enlarged view of the camshaft as the inspection object component W. The camshaft includes eight cam portions C1 to C8 and four journal portions J1 to J4. The cam portion inspection illumination 11 irradiates the cam portions C1 to C8 with light, and the cam portion inspection camera 12 photographs the irradiated regions. The journal portion inspection illumination 13 irradiates the journal portions J1 to J4 with light, and the journal portion inspection camera 14 photographs the irradiated regions.

Figure 2C:
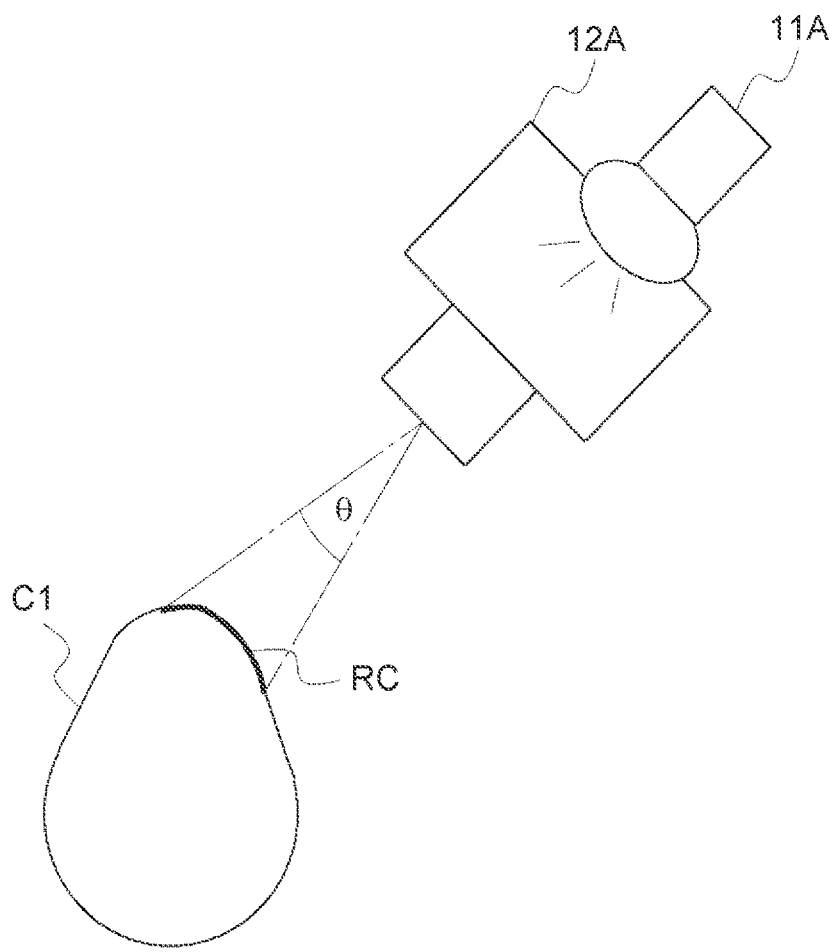
FIG. 2C is a schematic diagram showing an example of the position relation of a cam portion, a cam portion inspection illumination and a cam portion inspection camera according to the Embodiment 1.

FIG. 2C is a schematic diagram showing an example of the position relation of the cam portion C1, the cam portion inspection illumination 11A and the cam portion inspection camera 12A. In the cam portion inspection illumination 11A and the cam portion inspection camera 12A, respective frontal portions of the illumination and the camera are disposed on an identical line, and the cam portion C1 is disposed on an extended line from the identical line. That is, the cam portion inspection illumination 11A and the cam portion inspection camera 12A are disposed so as to have the same attitude (the same phase) relative to the cam portion C1. The cam portion inspection illumination 11A irradiates the cam portion C1 with light. The cam portion inspection camera 12A has an angular field θ for photographing the rotation direction of the cam portion, and photographs a photographed region RC on the cam portion. The cam portion inspection illumination 11A and the cam portion inspection camera 12A are disposed in the same position relation relative to not only the cam portion C1 but also the other cam portions, and can photograph predetermined photographed regions on the cam portions similarly. Further, the cam portion inspection illumination 11B and the cam portion inspection camera 12B are also disposed in the same position relation as the cam portion inspection illumination 11A and the cam portion inspection camera 12A, relative to the respective cam portions, and can photograph predetermined photographed region on the cam portions similarly.

Back to FIG. 2A, the description will be continued. The rotation motor 15 constitutes a rotation mechanism that supports a shaft of the inspection object component W and rotates the shaft of the inspection object component W about an axis, together with a clamp FC provided on the front side of the inspection object component W and a clamp RC provided on the rear side of the inspection object component W. The user fixes both ends of the inspection object component W by the clamp FC and the clamp RC, and thereby puts the inspection object component W into a rotatable state. Thereafter, the rotation motor 15 rotates the inspection object component W by the control from the information processing device 20.

More specifically, when the information processing device 20 executes the inspection of the cam portion of the inspection object component W, the information processing device 20 rotates the rotation motor 15, and controls the cam portion inspection camera 12 such that the cam portion inspection camera 12 continuously photographs the cam portion multiple times, while the inspection object component W rotates once in a state where the cam portion inspection illumination 11 is put on. Thereby, the cam portion inspection camera 12 photographs a different region on the cam portion for each photographing. The information processing device 20 decides parameters relevant to the photographing, as exemplified by the photographing interval of the cam portion inspection camera 12, the number of times of photographing (photographing time) of the cam portion inspection camera 12, and the rotation speed of the rotation motor 15, such that the cam portion inspection camera 12 photographs the whole surface of the cam portion of the inspection object component W by photographing the cam portion multiple times.

After the photographing of the cam portion described above, the information processing device 20 puts off the cam portion inspection illumination 11, and puts on the journal portion inspection illumination 13 instead. Then, the information processing device 20 rotates the rotation motor 15, and controls the journal portion inspection camera 14 such that the journal portion inspection camera 14 continuously photographs the journal portion multiple times while the inspection object component W rotates once. Thereby, the journal portion inspection camera 14 photographs a different region on the journal portion for each photographing.

In the embodiment, the information processing device 20 decides the above-described parameters relevant to the photographing, such that an identical spot of the cam portion appears in three pieces of the continuous pickup data, in the continuous photographing by the cam portion inspection camera 12.

FIGS. 2D to 2F show images of the cam portion that are photographed at continuous timings (1) to (3), respectively. In each image, the region RC irradiated with light as shown in FIG. 2C is photographed. At the timing (1) shown in FIG. 2D, a predetermined spot SP of the cam portion is positioned at an upper edge portion of an image IM. At this time, the cam portion rotates in the downward direction. Therefore, at the timing (2) when time elapses from the timing (1), the predetermined spot SP moves in the downward direction on the image IM, as shown in FIG. 2E. In FIG. 2E, the predetermined spot SP is positioned at a region of a central portion of the image IM. At the timing (3) when time further elapses from the timing (2), the predetermined spot SP further moves in the downward direction on the image IM, as shown in FIG. 2F. In FIG. 2F, the predetermined spot SP is positioned at a lower edge portion of the image IM.

In the case where the cam portion inspection camera 12 photographs the cam portion in this way, the cam portion surface that is photographed configures a curved surface. Therefore, the state of the light with which the cam portion inspection illumination 11 irradiates the predetermined spot SP and that enters the cam portion inspection camera 12 after the reflection on the predetermined spot SP is different among FIGS. 2D to 2F.

Figure 2G:
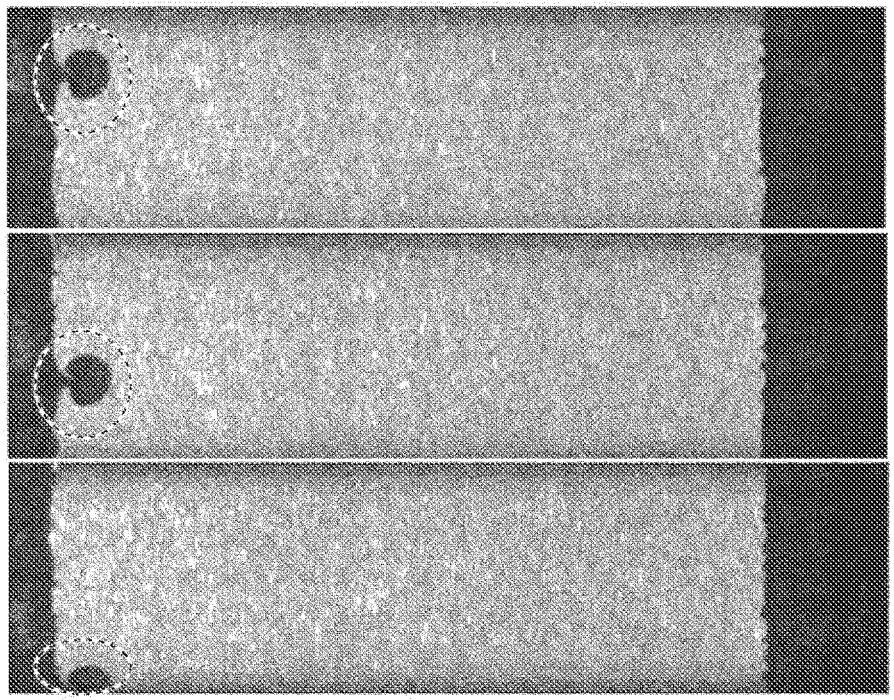
FIG. 2G shows images showing a shrinkage cavity on a cam portion surface that is actually photographed in Embodiment 1.

FIG. 2G is an image that is actually photographed, and is an image of the region RC where a shrinkage cavity is on the cam portion surface. The shrinkage cavity is an example of a defect (substantial abnormality) that is generated on the cam portion surface. In FIG. 2G, an image on an upper stage, an image on a middle stage and an image on a lower stage correspond to the timings (1), (2) and (3) shown in FIGS. 2D to 2F, respectively. As shown in FIG. 2G, at each timing, the shrinkage cavity is clearly picked up. This is because the shrinkage cavity forms a cavity having a certain degree of depth on the cam portion surface and therefore reflects different light from spots other than the shrinkage cavity even when the photographing place is different.

Figure 2H:
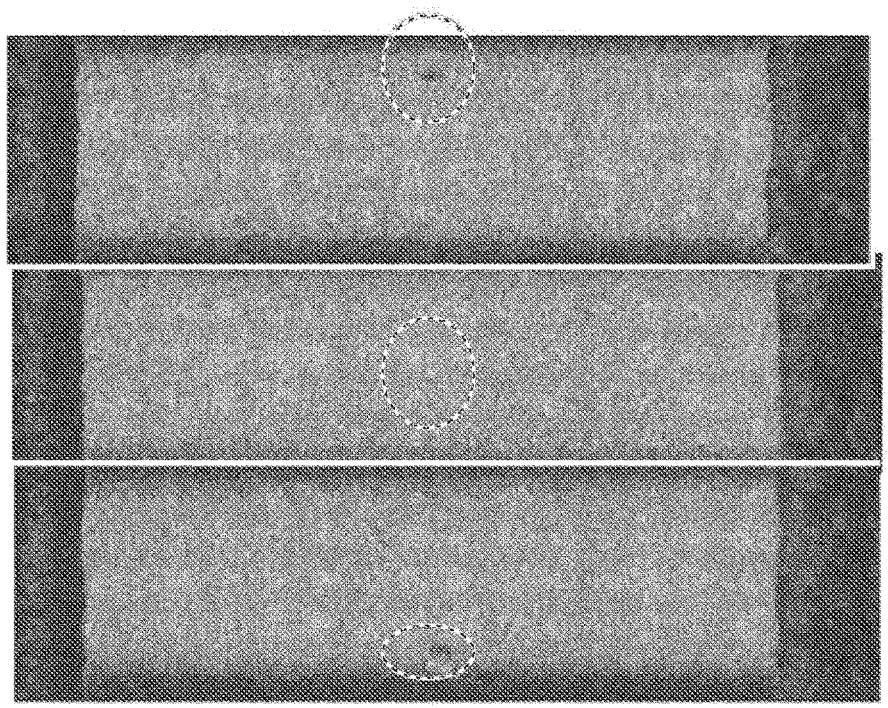
FIG. 2H shows images showing a liquid droplet on a cam portion surface that is actually photographed in Embodiment 1.

FIG. 2H is an image that is actually photographed, and is an image of the region RC where a liquid droplet (for example, a cleaning liquid) is on the cam portion surface. The liquid droplet is an example of an event (also referred to as a false abnormality) that is generated on the cam portion surface and that is an abnormality about the external appearance but is not a substantial abnormality. In FIG. 2F, an image on an upper stage, an image on a middle stage and an image on a lower stage correspond to the timings (1), (2) and (3) shown in FIGS. 2D to 2F, respectively. With reference to FIG. 2H, in the image photographed at the timing (2) (that is, an image when the liquid droplet is in front of the cam portion inspection camera 12 in FIG. 2C), the liquid droplet is picked up in a state where the liquid droplet can be hardly recognized. However, in the images photographed at the timings (1) and (3), the liquid droplet is picked up in a state where the liquid droplet can be recognized. This is because regions on the cam portion surface that correspond to an upper edge portion and lower edge portion of the image are shady regions that are hard to be irradiated with light due to the position relation of the cam portion inspection illumination 11, the cam portion inspection camera 12 and the region RC. Therefore, at the timings (1) and (3), the liquid droplet is photographed as a pattern that has a form and light and dark portions similar to the shrinkage cavity shown in FIG. 2G. That is, an excessive detection can be performed due to the inspection using the image in which the liquid droplet appears at the upper edge portion and the image in which the liquid droplet appears at the lower edge portion.

As the defect other than the shrinkage cavity, a scratch can exist on the cam portion surface. In such a case, the scratch is clearly picked up, regardless of the photographing timing. On the other hand, as the false abnormality other than the liquid droplet, a scar made by burring with a brush can exist on the cam portion surface. As shown in FIG. 2H, at the timing (2), this pattern is picked up in a state where the patter can be hardly recognized, but at the timings (1) and (3), the pattern can be photographed as a pattern that has a form and light and dark portions similar to a linear scratch. In this case also, an excessive detection can be performed due to the inspection using the image in which the scar made by burring appears at the upper edge portion and the image in which the scar made by burring appears at the lower edge portion.

As described later, in the present disclosure, the inspection of the information processing device 20 is performed such that the excessive detection is restrained. The information processing device 20 acquires the images of the cam portions and the journal portions that are obtained as described above, executes a later-described process, and thereby determines whether the abnormality exists in each image. Particularly, in the embodiment, a determination process for detecting the abnormality of the cam portion will be described.

Next, the information processing device 20 will be described. The information processing device 20 includes a database (DB) 21, a display panel 22, an input unit 23 and a control unit 24.

In the DB 21, three kinds of learning models necessary for the inspection are stored. Each of the learning models is an artificial intelligence (AI) model that has learned using images as teaching data by machine learning such as deep learning in advance. Details of the learning models will be described later. Further, all thresholds that are used for the determination in a later-described inspection unit are stored in the DB 21.

The DB 21 is constituted by a storage device such as a flash memory, a memory card, a hard disk drive (HDD) and an optical disk drive, for example, but the kind of the storage device is not limited to them. Further, the DB 21 may be provided in the exterior of the information processing device 20. In this case, the information processing device 20 may be connected with the DB 21 through an unillustrated information sending-receiving unit, and may acquire data stored in the DB 21.

The display panel 22 is an interface that shows a determination result about the presence or absence of the abnormality by the information processing device 20, to the user. The input unit 23 is an interface through which the user inputs instructions relevant to the start of the inspection and the setting of the inspection, to the information processing device 20.

The control unit 24 controls the cam portion inspection illumination 11, the cam portion inspection camera 12, the journal portion inspection illumination 13, the journal portion inspection camera 14, and the rotation motor 15 as described above, to photograph the cam portions and journal portions of the inspection object component W. Then, the control unit 24 acquires the images respectively picked up from the cam portion inspection camera 12 and the journal portion inspection camera 14, and executes the inspection as described below.

FIG. 3A is a block diagram for describing the configuration of the control unit 24. The control unit 24 includes a memory 241, an input/output (I/O) unit 242 and an information processing unit 243. Each unit of the control unit 24 will be described below.

The memory 241 is constituted by a volatile memory, a nonvolatile memory or a combination of the volatile memory and the nonvolatile memory. The memory 241 is not limited to a single memory, and a plurality of memories may be provided. For example, the volatile memory may be a random access memory (RAM) such as a dynamic random access memory (DRAM), a static random access memory (SRAM). For example, the nonvolatile memory may be a programmable ROM (PROM), an erasable programmable read only memory (EPROM) or a flash memory.

The memory 241 is used for storing one or more commands. The one or more commands are stored in the memory 241 as a software module group. The information processing unit 243 reads the one or more commands from the memory 241, and executes the one or more commands. Thereby, the information processing unit 243 can perform processes described below.

The I/O unit 242 is a hardware interface that exchanges information with the exterior of the control unit 24. In the embodiment, the control unit 24 is connected with the cam portion inspection illumination 11, the cam portion inspection camera 12, the journal portion inspection illumination 13, the journal portion inspection camera 14 and the rotation motor 15, and exchanges information with them through the I/O unit 242 when appropriate.

The information processing unit 243 is constituted by an arbitrary processor for analyzing the image, and the like. In this example, the information processing unit 243 includes a graphics processing unit (GPU) that is useful for image processing, as the processor. The information processing unit 243 may include a central processing unit (CPU), a micro processing unit (MPU), a field-programmable gate array (FPGA), a digital signal processor (DSP), an application specific integrated circuit (ASIC), as the processor. The memory 241 may include a memory incorporated in the information processing unit 243, in addition to the memory provided in the exterior of the information processing unit 243.

The information processing unit 243 reads software (computer program) from the memory 241, and executes the software. Thereby, the information processing unit 243 realizes functions of an image acquisition unit 244, a 245, and the like. The 245 can be divided into functions of a first inspection unit 246 and a second inspection unit 247 that are further segmented.

The image acquisition unit 244 acquires the photographed images from the cam portion inspection camera 12 and the journal portion inspection camera 14 through the I/O unit 242. The acquired images of the cam portions are output to the first inspection unit 246.

FIG. 3B shows the first inspection unit 246, the second inspection unit 247, and two kinds of learning models. The learning models are stored in the DB 21, and are accessed and used for inspection by the first inspection unit 246 and the second inspection unit 247, respectively. Each inspection unit will be described below in detail with reference to FIG. 3B.

The first inspection unit 246 inputs the image (first pickup data) of the cam portion that is photographed by the cam portion inspection camera 12, to a first learning model M1, and determines whether there is doubt of the abnormality of the cam portion, based on a result output from the first learning model M1.

The first learning model M1 is a model that has learned using images of the cam portion as teaching data and that outputs a calculation value relevant to the presence or absence of the abnormality about the external appearance of the cam portion as an output result when the image is input. As a detailed example, the first learning model M1 executes a semantic segmentation process for the input image, and thereby calculates and outputs a first determination value for the image. The first determination value expresses the normality degree of the cam portion that appears in the image. As the first determination value is larger, the surface of the cam portion in the image is cleaner, and as the first determination value is smaller, a pattern more similar to a scratch such as a dent or a defect such as a shrinkage cavity appears on the surface. The first inspection unit 246 compares the calculated first determination value with a threshold TH1 stored in the DB 21, and determines that an image for which the first determination value is equal to or smaller than the threshold TH1 is an image having the abnormality about the external appearance of the cam portion. On the other hand, the first inspection unit 246 determines that an image for which the first determination value is larger than the threshold TH1 is an image having no abnormality about the external appearance of the cam portion.

The first learning model M1 may divide the image into a plurality of sections, and may calculate the first determination value for each of the sections. In this case, the first inspection unit 246 may determine that the image has the abnormality about the external appearance of the cam portion, in the case where the first determination value for at least one section of the image is equal to or smaller than the threshold TH1. Alternatively, the first inspection unit 246 may determine that the image has the abnormality about the external appearance of the cam portion, in the case where the number of sections of the image for the first determination value equal to or smaller than the threshold TH1 is equal to or more than a threshold that is a plural number.

The abnormality about the external appearance means a state where the surface of the cam portion is not clean, and means that it is possible to visually recognize that there is a pattern such as a line or a circle on the surface or there is a spot having a different brightness on the surface (for example, there is a darker spot than the periphery), for example. In the case where there is a pattern such as a circle on the cam portion surface or in the case where there is a dark spot on the surface, there is a possibility that a shrinkage cavity is generated on the surface, and in the case where there is a pattern with lines on the surface, there is a possibility that a scratch is generated on the surface. The scratch and the shrinkage cavity mean the defect (substantial abnormality) of the inspection object component W. However, even when there is a pattern such as a circle on the cam portion surface, there is a possibility that the pattern is caused by a liquid droplet on the surface. Further, even when there is a pattern with lines on the surface, there is a possibility that the pattern is a scar made by a brush for barring, a scar made by check of the inspection object component W or a grind stone scar made in grinding processing. Each of the patterns is naturally generated by processing in a production stage for the inspection object component W, and is not the defect of the inspection object component W. Therefore, there can be a problem of the excessive detection in that the abnormality inspection system determines that an image containing a pattern having such a false abnormality is abnormal.

In the embodiment, in the case where it is determined that there is the abnormality about the external appearance of the cam portion in one image that is input, the first inspection unit 246 inputs two images picked up so as to be continuous with the one image, to the first learning model M1. The first inspection unit 246 determines where the region for which it is determined that there is the abnormality about the external appearance is in the one image, and selects two other images in which the abnormality about the external appearance appears, as the images to be input to the first learning model M1, depending on the determined place.

In this example, an upper region, a central region and a lower region are defined as one-third regions into which the whole region of the image is divided in a top-bottom direction. As shown in FIGS. 2D to 2F, the rotation direction of the cam portion is the direction from the top of the screen to the bottom of the screen. In this case, when the spot where the abnormality about the external appearance appears is in the upper region of the image, the first inspection unit 246 selects the images photographed just after the photographing timing of the image to be determined and further just after that. Further, when the spot where the abnormality about the external appearance appears is in the central region of the image, the first inspection unit 246 selects the images photographed just before and just after the photographing timing of the image to be determined. Moreover, when the spot where the abnormality about the external appearance appears is in the lower region of the image, the first inspection unit 246 selects the images photographed just before the photographing timing of the image to be determined and further just before that.

The first inspection unit 246 compares the first determination values calculated for the two images with the threshold TH1 stored in the DB 21. Similarly to the above description, the first learning model M1 divides each image into a plurality of sections, and may calculate the first determination value for each of the sections. Then, in the case where the first determination value is equal to or smaller than the threshold TH1 for both of the two images (that is, in the case where the abnormality about the external appearance is detected for both of the two images), the first inspection unit 246 determines that there is doubt of the abnormality in the image that is first determined. The image for which it is determined that there is doubt of the abnormality is re-inspected by the second inspection unit 247. In the case where it is determined by the re-inspection that the defect appears in the image, it is eventually determined that the inspection object component W is abnormal. The image for which it is determined that there is no doubt of the abnormality is not inspected by the second inspection unit 247.

The second inspection unit 247 inputs the whole of the image (second pickup data) of the cam portion for which it is determined that there is doubt of the abnormality, to the second learning model M2. In the case where the first learning model M1 is a model that divides the image into a plurality of sections and that calculates the first determination value for each of the sections, the second inspection unit 247 may cut out a section of the image for which the first determination value is equal to or smaller than the threshold TH1, and may input only the image of the cutout section to the second learning model M2.

FIG. 3C is a diagram showing an example of a process in which the second inspection unit 247 cuts out the image. In an original image IM photographed by the cam portion inspection camera 12, a pattern DA for which there is doubt of the abnormality exists, and thereby the first inspection unit 246 determines that the first determination value for a section DA of the image IM is equal to or smaller than the threshold TH1. At this time, the second inspection unit 247 can cut out the section DA from the image IM, and can input only the image of the section DA to the second learning model M2.

The second learning model M2 outputs a calculation result based on the image input as described above. The second inspection unit 247 determines whether there is the abnormality of the cam portion, based on the output result from the second learning model M2.

The second learning model M2 is a different kind of AI model from the first learning model M1. The second learning model M2 is a model that has learned using images of the cam portion as teaching data and that outputs a calculation value relevant to the type of the abnormality about the external appearance of the cam portion as an output result when the image is input. More specifically, the second learning model M2 executes a classification process for the input image, and calculates and outputs a second determination value for the input image. The second determination value is the concordance rate between the input image and the pattern having the above-described false abnormality, and is the cosine (cos θ) when the inner product between the input image and the pattern having the false abnormality is calculated. The second learning model M2 calculates the second determination value for each kind of modeled patterns having the false abnormality. As the second determination value is larger (as the second determination value is closer to 1), the pattern on the cam portion surface in the image is more similar to the pattern (for example, at least one pattern of the liquid droplet, the scar made by a brush for barring, the scar made by check and the grid stone scar) having the false abnormality, and it is more likely that there is no substantial abnormality. On the other hand, as the second determination value is smaller, the pattern on the cam portion surface is less similar to the pattern having the false abnormality, and therefore there is a higher possibility that the pattern is the defect such as the scratch and the shrinkage cavity.

The second inspection unit 247 compares the calculated second determination value with a threshold TH2 stored in the DB 21. The threshold TH2 is also set for each kind of modeled patterns having the false abnormality. The second inspection unit 247 determines that an image for which the second determination value is equal to or smaller than the threshold TH2 for all kinds of the pattern having the false abnormality is an image in which there is the abnormality of the cam portion. On the other hand, the second inspection unit 247 determines that an image for which the second determination value is larger than the threshold TH2 for at least one kind of the pattern having the false abnormality is an image in which there is no abnormality of the cam portion.

In the case where the second inspection unit 247 inputs only the image of a section resulting from cutting out a part of the photographed original image, to the second learning model M2, the second learning model M2 executes the above-described classification process for the section, and calculates and outputs the second determination value for the section.

In the embodiment, in the case where it is determined that there is the abnormality of the cam portion in one input image, the second inspection unit 247 selects two images picked up so as to be continuous with the one image, and inputs the two images to the second learning model M2. The two images that are selected are the same as the two images that are selected by the first inspection unit 246. In the case where the one input image is the image of the cutout section, the second inspection unit 247 cuts out sections for which the first determination value is equal to or smaller than the threshold TH1, from the two images selected by the first inspection unit 246, and inputs the images of the two sections obtained by cutout, to the second learning model M2. The second inspection unit 247 compares the calculated second determination value with the threshold TH2 stored in the DB 21, for the images of the two sections. In the case where the second determination value is equal to or smaller than the threshold TH2 about all kinds of the pattern having the false abnormality for both of the two images (that is, in the case where the abnormality is detected from both of the two input images), the second inspection unit 247 determines that there is the abnormality of the cam portion.

The first inspection unit 246 and the second inspection unit 247 executes the above-described process for each of images photographed by the cam portion inspection cameras 12. Then, in the case where the second inspection unit 247 has never determined that there is the abnormality of the cam portion, the second inspection unit 247 determines that there is no abnormality of the cam portion that is photographed and inspected. On the other hand, in the case where the second inspection unit 247 determines that there is the abnormality of the cam portion for at least one image, the second inspection unit 247 determines that there is the abnormality of the cam portion. However, the second inspection unit 247 may determine that there is the abnormality of the cam portion in the case where the number of times of the determination of the abnormality of the cam portion is equal to or more than a threshold that is a plural number. In the case where the second inspection unit 247 determines that there is the abnormality of the cam portion that is inspected, the second inspection unit 247 determines that there is the abnormality of the inspection object component W.

The second inspection unit 247 can display the above determination result on the display panel 22 of the information processing device 20. The second inspection unit 247 may specify the cam portion for which it is determined that there is the abnormality, by identifying the cam portion inspection camera 12 having photographed the cam portion and the photographing direction, and may display the specified result on the display panel 22.

Although not illustrated, the 245 may further have a function of an inspection that executes the inspection of the journal portion using the image of the journal portion that is acquired by the journal portion inspection camera 14.

Figure 4A:
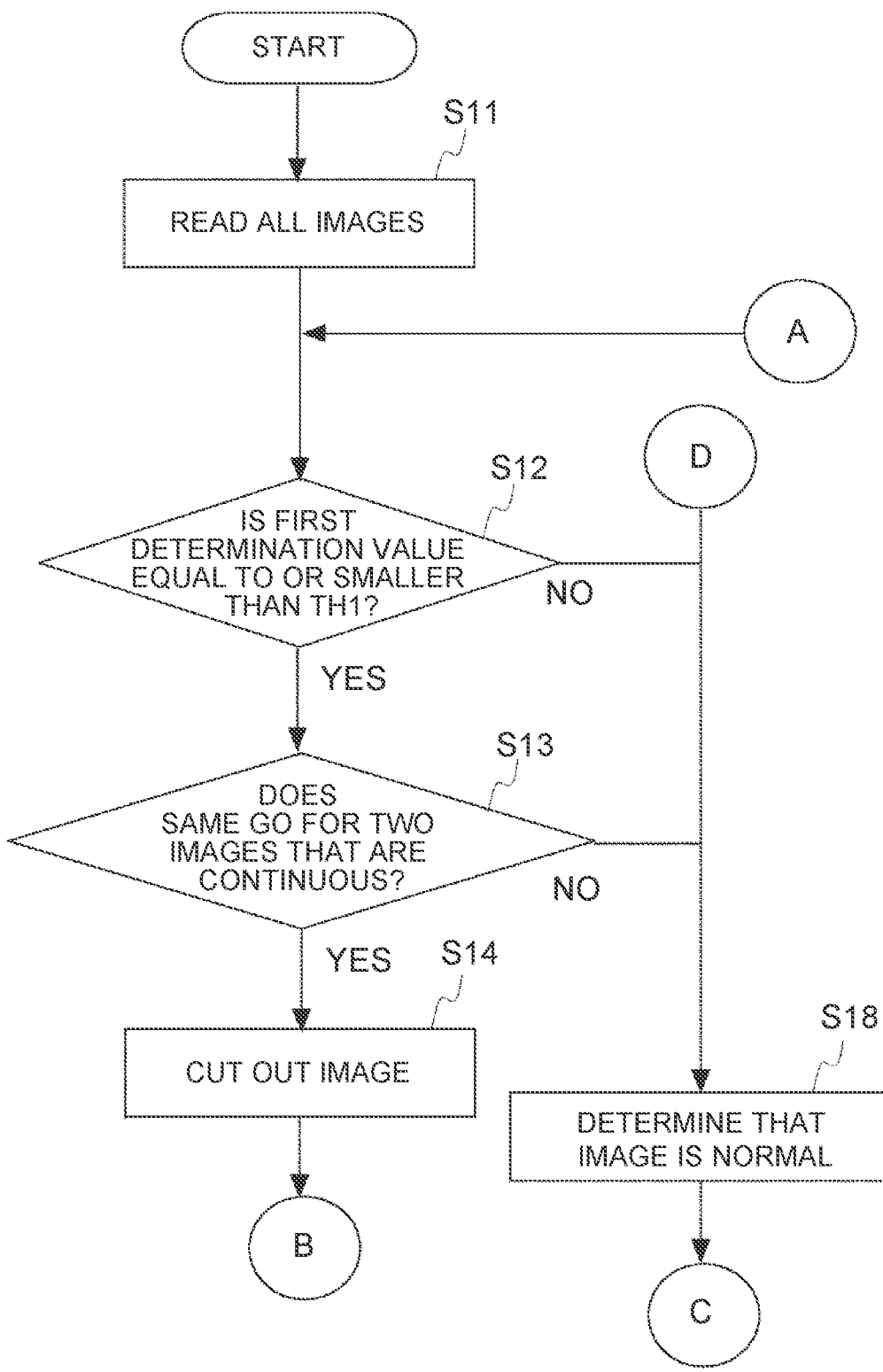
FIG. 4A is a flowchart showing a processing example when the abnormality inspection system according to Embodiment 1 executes the inspection of the cam portion.
Figure 4B:
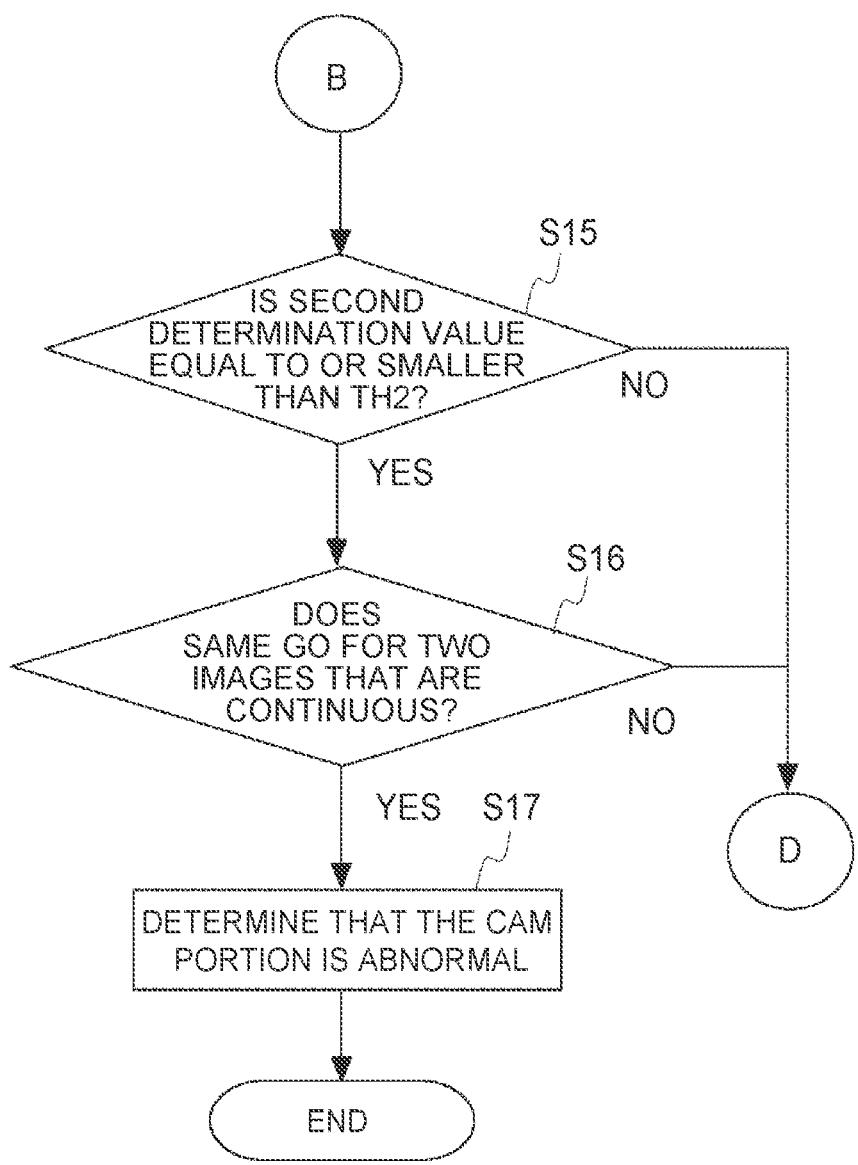
FIG. 4B is a flowchart showing the processing example when the abnormality inspection system according to Embodiment 1 executes the inspection of the cam portion.

FIGS. 4A to 4C are flowcharts showing an example of a process in which the abnormality inspection system S1 executes the inspection of the cam portion, and this process will be described below with reference to FIGS. 4A to 4C. Details of each process have been above, and descriptions are omitted when appropriate.

First, the user operates the input unit 23, and thereby the information processing device 20 causes the inspection device 10 to execute the inspection of the cam portion of the inspection object component W. In this inspection, the image acquisition unit 244 reads all images photographed by the cam portion inspection camera 12 (step S11).

The first inspection unit 246 inputs one image of the read images, to the first learning model M1. Then, the first inspection unit 246 determines whether the first determination value calculated by the first learning model M1 is equal to or smaller than the threshold TH1 (step S12).

In the case where the first determination value is equal to or smaller than the threshold TH1 (Yes in step S12), the first inspection unit 246 inputs two images picked up so as to be continuous with the input image, to the first learning model M1. The method for selecting the two images has been described above. The first inspection unit 246 compares the first determination values calculated for the two images with the threshold TH1, and determines whether the first determination values are equal to or smaller than the threshold TH1 for both of the two images (step S13).

In the case where the first determination values are equal to or smaller than the threshold TH1 for both of the two images (Yes in step S13), the first inspection unit 246 determines that there is doubt of the abnormality in the image that is first determined. Depending on the determination result, the second inspection unit 247 cuts out a section for which the first determination value is equal to or smaller than the threshold TH1, from the image that is first determined (step S14). Then, the second inspection unit 247 inputs the image of the cutout section, to the second learning model M2. The second inspection unit 247 determines whether the second determination value calculated by the second learning model M2 is equal to or smaller than the threshold TH2 for all kinds of the pattern having the false abnormality (step S15).

In the case where the second determination value is equal to or smaller than the threshold TH2 for all kinds of the pattern having the false abnormality (Yes in step S15), the second inspection unit 247 inputs two images picked up so as to be continuous with the input image, to the second learning model M2. The method for selecting the two images has been described above. The second inspection unit 247 compares the second determination values calculated for the two images with the threshold TH2, and determines whether the second determination value is equal to or smaller than the threshold TH2 about all kinds of the pattern having the false abnormality for both of the two images (step S16).

In the case where the second determination value is equal to or smaller than the threshold TH2 about all kinds of the pattern having the false abnormality for both of the two images (Yes in step S16), the second inspection unit 247 determines that there is the abnormality of the cam portion, based on the determination result for the image, and the abnormality inspection system S1 ends the inspection process (step S17).

On the other hand, in the case where the first determination value is larger than the threshold TH1 in step S12 (No in step S12), the first inspection unit 246 determines that the image that is inspected is normal (there is no abnormality) (step S18). The same determination is made also in the case where the first determination value is larger than the threshold TH1 for at least one of the two images in step S13 (No in step S13).

Further, in the case where the second determination value is larger than the threshold TH2 about at least one kind of the pattern having the false abnormality in step S14 (No in step S15), the second inspection unit 247 determines that the image that is inspected is normal (step S18). The same determination is made also in the case where the second determination value is larger than the threshold TH2 about at least one kind of the pattern having the false abnormality for at least one of the two images in step S16 (No in step S16).

Thereafter, the first inspection unit 246 determines whether the above-described determination has been ended for all images read in step S11 (step S19). In the case where there is an image for which the determination has not been ended (No in step S19), the first inspection unit 246 returns to step S12, and executes the process for the image for which the determination has not been performed. On the other hand, in the case where the determination has been ended for all images (Yes in step S19), the first inspection unit 246 determines that the cam portion is normal, and the abnormality inspection system S1 ends the inspection process (step S20).

In the above-described flow, the information processing device 20 executes the inspection by the first inspection unit 246 and the second inspection unit 247 for one image, and executes the inspection for the respective images in a sequential order, as described above. However, the information processing device 20 may collectively execute the inspection by the first inspection unit 246 for a plurality of images (for example, all read images), and may execute the inspection by the second inspection unit 247 for an image that is of the plurality of images and for which the first determination value is equal to or smaller than the threshold TH1.

As described above, the image acquisition unit 244 of the abnormality inspection system S1 acquires images of the cam portion, such that an identical spot of the component is contained in mutually different regions in a plurality of continuous images. Then, the second inspection unit 247 (245) detects the presence or absence of the abnormality in the plurality of continuous images, and determines that the cam portion is abnormal, in the case where the abnormality is detected in all of the plurality of images.

As shown in FIGS. 2G and 2H, in the case where the pattern having the false abnormality is generated on the cam portion surface, the abnormality inspection system can wrongly determine (excessively detect) that the pattern is the defect such as the shrinkage cavity, depending on the position of the pattern at the time of the image photographing. Further, in the case where a learning model learns for restraining the excessive detection, the learning model, conversely, can wrongly determine that a defect site is the false abnormality.

The abnormality inspection system S1 according to the present disclosure determines the abnormality of the cam portion based on a detection result relevant to a plurality of images in which an identical spot of the cam portion is photographed in different states. Therefore, for example, even when the pattern having the false abnormality is on an upper edge or lower edge of one image, in the case where the pattern is photographed at an image center in another image, the abnormality inspection system S1 can determine that the pattern having the false abnormality is not the abnormality, based on the other image. Accordingly, the abnormality inspection system S1 can exactly detect the abnormality of the cam portion. Further, in the image inspection for the cam portion that has a curved surface, it is possible to exert such an effect, by continuously photographing images such that the photographed region for the cam portion overlaps between serial images, using a relatively low cost area camera, without using a line camera that has a high accuracy but is expensive. Therefore, it is possible to configure the abnormality inspection system S1 at a lower cost.

For the second inspection unit 247, the learning is performed using images of the cam portion as teaching data. The presence or absence of the abnormality may be detected by inputting a plurality of continuous images to the second learning model M2. The abnormality inspection system detects the abnormality using the learning model after learning, and therefore can more accurately determine the presence or absence of the abnormality.

The second inspection unit 247 may input one image to the second learning model M2, and when it is determined that the abnormality is detected in the one image from an output result of the second learning model M2, the second inspection unit 247 may detect the presence or absence of the abnormality for all of a plurality of images, by inputting other images picked up so as to be continuous with the one image, to the second learning model M2. In the case where there is no abnormality as a result of the execution of the first determination using one image, the abnormality inspection system S1 does not execute a further process for the image. Therefore, it is possible to restrain unnecessary processes, and to more efficiently perform the inspection.

The second learning model M2 may be a model that outputs the type of the abnormality about the external appearance of the cam portion as an output result, and the second inspection unit 247 may determine the presence or absence of the abnormality of the cam portion, depending on the type of the abnormality about the external appearance of the cam portion that is indicated by the output result of the second learning model M2 for a plurality of continuous images. Thereby, it is possible to restrain the abnormality inspection system S1 from wrongly detecting that a cam portion that is abnormal about the external appearance but that is not abnormal in terms of the substantial quality of the cam portion is abnormal.

The first inspection unit 246 may determine the presence or absence of doubt of the abnormality in the image, by inputting images acquired by the image acquisition unit 244, to the first learning model M1, and the second inspection unit 247 may determine the presence or absence of the abnormality, by inputting continuous images including the image for which it is determined that there is doubt of the abnormality, to the second learning model M2. The abnormality inspection system S1 determines the abnormality of the component, using two kinds of different learning models, and therefore can enhance the accuracy of the inspection of the abnormality.

The first inspection unit 246 inputs one image to the first learning model M1, and when it is determined that the abnormality about the external appearance is detected in the one image from the output result of the first learning model M1, the first inspection unit 246 inputs other images picked up so as to be continuous with the one image to the first learning model M1. Then, in the case where the abnormality about the external appearance is detected also in the other images, it may be determined that there is doubt of the abnormality of the cam portion. In the case where there is no abnormality as a result of the execution of the first determination by the first learning model M1 using the one image, the abnormality inspection system does not execute a further process for the pickup data. Therefore, it is possible to restrain unnecessary processes, and to more efficiently perform the inspection. Further, since the first inspection unit 246 inputs a plurality of images to the first learning model M1 and determines the doubt of the abnormality, it is possible to reduce the number of images for which it is determined that there is doubt of the abnormality (that is, the number of images that are inspected by the second inspection unit 247). The second learning model M2 has a high accuracy, but requires a much longer inference time for one input image than the first learning model M1. By reducing the number of images that are inspected by the second inspection unit 247, it is possible to restrain the time spent on the whole inspection.

The image acquisition unit 244 may acquire images of the cam portion such that an identical spot of the cam portion is contained in at least three continuous images. The abnormality inspection system S1 determines the abnormality of the cam portion, based on a detection result using three or more images in which the identical spot of the cam portion is distributed at different places in the images. Accordingly, it is possible to restrain the noise due to an image characteristic such as the degree of irradiation with light, in the inspection, and therefore it is possible to more exactly detect the abnormality of the cam portion.

The image acquisition unit 244 may acquire an image of a curved surface portion of the cam portion, in a state where the cam portion is rotated by a rotation mechanism that supports the cam portion (inspection object component W) and rotates the cam portion about an axis. Thereby, the abnormality inspection system S1 can efficiently acquire continuous images of the cam portion, and therefore can shorten the time spent on the whole inspection.

The present disclosure is not limited to the above embodiment, and can be appropriately modified without departing from the spirit.

For example, in the embodiment, the inspection of the cam portion is performed in two stages by the first inspection unit 246 and the second inspection unit 247, as described above, but the inspection of the cam portion may be performed in three or more stages. For example, an inspection that is not the inspection by the second inspection unit 247 may be further performed before or after the inspection by the first inspection unit 246.

In the inspection, only a part of the surface of the cam portion may be photographed and inspected, instead of photographing and inspecting the whole of the surface of the cam portion. The same goes for the journal portion. Further, at least one of the cam portion inspection camera 12 and the journal portion inspection camera 14 that are used in the inspection may be another kind of camera such as a line camera, instead of an area camera.

In the embodiment, only one of the process of step S13 by the first inspection unit 246 and the process of step S16 by the second inspection unit 247 may be executed. Further, in step S13 or step S16, the number of additional images that are determined may be one, instead of two. For example, when the spot where the abnormality about the external appearance appears is in the upper region of the image in step S13, the first inspection unit 246 may additionally select an image photographed just after the photographing timing of the image that is determined. Similarly, when the spot where the abnormality about the external appearance appears is in the lower region, the first inspection unit 246 may additionally select an image photographed just before the photographing timing of the image that is determined. In each case, in the newly selected image, the spot where the abnormality about the external appearance appears is likely to be in the central region of the image, and therefore in the case where the abnormality about the external appearance is the pattern having the false abnormality, it is easy for the first inspection unit 246 to exactly determine that the abnormality about the external appearance is the pattern having the false abnormality. Thereby, it is possible to more efficiently execute the whole inspection.

The information processing device 20 may decide various parameters relevant to the above-described photographing, such that an identical spot of the cam portion appears in two continuous images or four or more continuous images in the continuous photographing by the cam portion inspection camera 12. In this case also, one or more images photographed so as to continuous with the immediately preceding image that is determined may be selected as additional images that are determined in step S13 or step S16. At this time, the first inspection unit 246 or the second inspection unit 247 may select all of images containing a region for which it is determined that there is the abnormality about the external appearance in the immediately preceding image that is determined, or may select some of the images. For example, the first inspection unit 246 determines where the region for which it is determined that there is the abnormality about the external appearance is in the image that is determined in step S12. Then, the first inspection unit 246 may select such one or more images that the region appears at a place further closer to the center (a photographed region allowing the excessive detection to be avoided) of the image compared to the image. The second inspection unit 247 also can execute the same process.

The object that is inspected by the first inspection unit 246 and the second inspection unit 247 may be a portion having a true circle as a section shape, as exemplified by the journal portion, instead of the shape of the cam portion. The inspection object component may be another kind of component instead of the camshaft. Even in this case, the abnormality inspection system S1 can continuously photograph a curved surface or planar surface of the component, and can execute the inspection described in the embodiment, for continuously photographed images.

In the embodiment, the inspection object component W rotates, and the camera of the abnormality inspection system S1 acquires images by continuously photographing the rotating inspection object component W. However, the method for acquiring images is not limited to this. For example, in the case where the inspection object component has a planar surface portion and where the camera continuously photographs the planar surface portion in a state where an illumination of the abnormality inspection system S1 irradiates the planar surface portion with light, the member that moves at the time of photographing may be the inspection object component, or may be the camera. In this way, when images containing an identical spot on the component surface is continuously photographed, the member that moves at the time of photographing may be the inspection object component or may be the camera (photographing unit). In each case, the position relation between the inspection object component and the camera continues to relatively change at the time of photographing, and therefore the abnormality inspection system S1 can continuously photograph images containing an identical spot on the component surface easily.

The appearing degree of the pattern having the false abnormality in the image is sometimes different from that shown in FIG. 2H, depending on the position relation of the camera and illumination of the abnormality inspection system S1 and the inspection object component and the characteristic (for example, whether the photographed region is a curved surface or a planar surface, and the value of the curvature in the case of a curved surface) of the inspection object component. In such a case, at least one of the first inspection unit 246 and the second inspection unit 247 may select images in which the region for which it is determined that there is the abnormality about the external appearance is positioned in the photographed region, based on information that is relevant to the photographed region allowing the excessive detection to be avoided and that is stored in the DB 21 in advance, in step S13 or step S16.

In the case where the abnormality inspection system S1 determines the presence or absence of the abnormality of the cam portion of the inspection object component W as described in the embodiment, the user may input the actual presence or absence of the abnormality of the cam portion or the kind (for example, the kind of the pattern showing the defect or the pattern showing the false abnormality) of the pattern of the cam portion that appears in the image, to the information processing device 20 through the input unit 23. Thereby, the first inspection unit 246 and the second inspection unit 247 can revise at least one of the first learning model M1 and the second learning model M2, based on the data fed back in this way.

As described above, a single or a plurality of processors included in the abnormality inspection system in the above-described embodiment execute a single or a plurality of programs including commands for causing a computer to execute the algorithm described with use of the drawings. By this processing, it is possible to realize the process described in each embodiment.

The program includes commands (or software codes) for causing the computer to execute one or more functions described in the embodiment when the program is read by the computer. The program may be stored in a non-transitory computer-readable medium or a substantial storage medium. Examples of the computer-readable medium or substantial storage medium, which is not limited, include a random-access memory (RAM), a read-only memory (ROM), a flash memory, a solid-state drive (SSD), another memory technology, a CD-ROM, a digital versatile disk (DVD), a Blu-ray® disk, another optical disk storage, a magnetic cassette, a magnetic tape, a magnetic disk storage and another storage device. The program may be sent to a transitory computer-readable medium or a communication medium. Examples of the transitory computer-readable medium or communication medium, which is not limited, include an electric propagation signal, an optical propagation signal, an acoustic propagation signal and a propagation signal having another form. Further, the program can be formed as an application, for example.

The present disclosure has been described above with reference to the embodiment. The present disclosure is not limited by the above description. For the configuration and detail of the present disclosure, various modifications that can be understood by those in the art can be made without departing from the scope of the present disclosure.

What is claimed is:

1. An abnormality inspection system comprising:
   a camera;
   a rotation motor that supports and rotates a component during inspection;
   a memory that stores a program;
   a processor configured to execute the program so as to:
   control the rotation motor to rotate the component about an axis of the component during inspection;
   control the camera to photograph the component in a state of the component being rotated by the rotation motor, wherein the camera photographs the component to obtain continuous images of a curved surface portion of the component from different angular conditions;
   acquire a plurality of pieces of the continuous images such that an identical spot of the curved surface portion of the component is contained in mutually different regions of the plurality of pieces of continuous images;
   input the plurality of pieces of continuous images to a first learning model that has learned using images of the component as teaching data, wherein the first learning model is a model that outputs a first determination value respectively for each of the plurality of pieces of continuous images, wherein the first determination value indicates a normality degree of the component that appears in the images, and as the first determination value is larger, the curved surface portion in the image has less patterns similar to an abnormality, and as the first determination value is smaller, the curved surface portion in the image has more patterns similar to an abnormality, and determines that the component is abnormal based on the first determination value in all of the plurality of pieces of continuous images; and
   based upon the determination by the first learning model that the component is abnormal, input the plurality of pieces of continuous images to a second learning model that has learned using images of the component as teaching data and that is different from the first learning model, wherein the second learning model is a model that outputs a second determination value respectively for each of the plurality of pieces of continuous images, wherein the second determination value indicates a concordance rate between the input images and a pattern having a false abnormality.

2. The abnormality inspection system according to claim 1, wherein the processor inputs a single piece of the images to the first learning model, and upon determination that the abnormality is detected in the single piece of the images, from an output result of the first learning model, the and detects the presence or absence of the abnormality in all of the plurality of pieces of images, by inputting other pieces of the images picked up so as to be continuous with the single piece of the images, to the first learning model.

3. The abnormality inspection system according to claim 2, wherein:
   the first learning model is a model in which the output result is a type of abnormality about an external appearance of the component; and
   the processor determines the presence or absence of the abnormality of the component, depending on the type of the abnormality about the external appearance of the component, the type of the abnormality about the external appearance of the component being indicated as the output result of the first learning model for the plurality of pieces of continuous images.

4. The abnormality inspection system according to claim 1, wherein the processor inputs a single piece of the images to the second learning model, and based upon the determination that the abnormality about an external appearance is detected in the single piece of the images, from an output result of the second learning model, the inputs other pieces of the images picked up so as to be continuous with the single piece of the images, to the second learning model, and determines that there is the doubt of the abnormality, in a case where the abnormality about the external appearance is detected in the other pieces of the images.

5. The abnormality inspection system according to claim 1, wherein the processor acquires the images of the component such that the identical spot of the component is contained in at least three pieces of continuous images.

6. The abnormality inspection system according to claim 1, wherein the processor is configured to compare the first determination value with a first threshold, and determine that an image for which the first determination value is equal to or smaller than the first threshold is an image having the abnormality, and the processor is configured to determine that an image for which the first determination value is larger than the first threshold is an image having no abnormality.

7. The abnormality inspection system according to claim 6, wherein the processor is further configured to:
   before the plurality of pieces of continuous images are input to the second learning model, cut out a section of the image for each of the plurality of pieces of continuous images having the first determination value equal to or smaller than the first threshold, so that the second learning model determines the second determination value based on images of the cutout section for each of the plurality of pieces of continuous images.

8. The abnormality inspection system according to claim 1, wherein the processor is configured to compare the second determination value with a second threshold, the second threshold is set for each kind of modeled patterns having the false abnormality, the processor is configured to determine that an image for which the second determination value is equal to or smaller than the second threshold for all kinds of the pattern having the false abnormality is an image having the abnormality, and the processor is configured to determine that an image for which the second determination value is larger than the second threshold for at least one kind of the pattern having the false abnormality is an image having no abnormality.

9. An abnormality inspection method in which an abnormality inspection system includes
a camera;
a rotation motor that supports and rotates a component during inspection;
a memory that stores a program; and
a processor configured to execute the program,
wherein the method comprises:
controlling the rotation motor to rotate the component about an axis of the component during inspection;
controlling the camera to photograph the component in a state of the component being rotated by the rotation motor, wherein the camera photographs the component to obtain continuous images of a curved surface portion of the component from different angular conditions;
acquiring a plurality of pieces of the continuous images such that an identical spot of the curved surface portion of the component is contained in mutually different regions of the plurality of pieces of continuous images;
inputting the plurality of pieces of continuous images to a first learning model that has learned using images of the component as teaching data, wherein the first learning model is a model that outputs a first determination value respectively for each of the plurality of pieces of continuous images, wherein the first determination value indicates a normality degree of the component that appears in the images, and as the first determination value is larger, the curved surface portion in the image has less patterns similar to an abnormality, and as the first determination value is smaller, the curved surface portion in the image has more patterns similar to an abnormality, and determining that the component is abnormal based on the determination value, in all of the plurality of pieces of continuous images; and
based upon the determination by the first learning model that the component is abnormal, inputting the plurality of pieces of continuous images to a second learning model that has learned using images of the component as teaching data and that is different from a first learning model, wherein the second learning model is a model that outputs a second determination value respectively for each of the plurality of pieces of continuous images, wherein the second determination value indicates a concordance rate between the input images and a pattern having a false abnormality.

* * * * *